United States Patent [19]

Nordin

[11] Patent Number: 4,666,165
[45] Date of Patent: May 19, 1987

[54] SEALING RING WITH PORTIONED LOCKING ELEMENT

[75] Inventor: Olof Nordin, Värnamo, Sweden

[73] Assignee: Forsheda AB, Forsheda, Sweden

[21] Appl. No.: 826,044

[22] Filed: Feb. 4, 1986

[30] Foreign Application Priority Data

Dec. 9, 1985 [SE] Sweden ............................. 8505802

[51] Int. Cl.⁴ ..................... F16J 15/12; F16J 15/32; F16L 17/02
[52] U.S. Cl. ............................ 277/207 A; 277/208; 277/220; 277/223; 277/166; 285/345; 285/379; 285/110
[58] Field of Search ............... 277/27, 207 R, 207 A, 277/207 B, 208–211, DIG. 2, 215, 218–220, 223, 165, 166; 285/231, 232, 345, 379, 110–112

[56] References Cited

U.S. PATENT DOCUMENTS

| | | | |
|---|---|---|---|
| 505,703 | 9/1893 | Dodge | 277/218 |
| 1,942,489 | 1/1934 | Pfefferle | 277/220 |
| 3,093,380 | 6/1963 | Macks | 277/220 X |
| 4,109,924 | 8/1978 | Stucke | 277/218 X |
| 4,379,559 | 4/1983 | Bohman | 277/207 A |

Primary Examiner—Robert S. Ward
Attorney, Agent, or Firm—Pollock, Vande Sande & Priddy

[57] ABSTRACT

A sealing ring for sealing a space between the outer surface of a spigot end and the inner surface of a socket end in a pipe joint comprises an annular sealing element consisting of elastomeric material and a substantially annular locking element consisting of a rigid or semi-rigid material. The locking element is divided at at least one point of its periphery and constitute at this point two spaced portions. Between these portions there is positioned a connecting element consisting of a material which is substantially more elastic than the material of the locking element.

10 Claims, 4 Drawing Figures

SEALING RING WITH PORTIONED LOCKING ELEMENT

FIELD OF THE INVENTION

The present invention relates to a sealing ring for sealing the space between two substantially concentrical sealing surfaces, for example for sealing the space between the outer surface of a spigot end and the inner surface of a socket end in a pipe joint.

BACKGROUND OF THE INVENTION

Sealing rings for sealing the space between the outer surface of a spigot end and the inner surface of a socket end in a pipe joint comprises an annular sealing element. Irrespective of the type of sealing action of the sealing element, such as compression sealing action, lip sealing action or a combination thereof, it is necessary that the sealing element consists of a relatively soft elastomeric material. However, a sealing ring in its entirety consisting of a material which is sufficiently soft and elastomeric to provide the sealing function is disadvantageous from the point of view that it is difficult to retain the material in the desired position in, for example, a groove in connection with the jointing of the pipes. There is also the risk that such a sealing ring will be displaced from its sealing position in the pipe joint if the difference of the pressures at each sides of the sealing ring is great. In order to obviate these problems and drawbacks it is previously known to provide the sealing ring with a locking element consisting of a ring of a material which is substantially more rigid than the elastomeric material of the sealing element, for example plastic. Thereby, the locking ring is usually positioned in a groove formed in the elastomeric material of the sealing ring. In order to present satisfactory properties with regard to mounting as well as locking action the size of the locking ring must be adapted to the diameter of the groove in a pipe wall in which the sealing ring shall be positioned within very small tolerances. If the locking ring is too large in relation to the groove it is difficult to mount and if it is too small there is provided an unreliable locking of the sealing ring. With regard to the fact that plastic pipes as well as concrete pipes present relatively great dimensional tolerances the requirements with regard to a correct diameter relationship between the locking ring and the groove of the pipe wall are difficult to provide, even if the locking ring is manufactured with small tolerances.

SUMMARY OF THE INVENTION

The object of the invention is to provide a sealing ring which is improved with regard to the above problems and drawbacks. In accordance with the invention there is provided a sealing ring for sealing a space between two substantially concentrical sealing surfaces, for example for sealing a space between the outer surface of a spigot end and the inner surface of a socket end in a pipe joint, comprising an annular sealing element consisting of elastomeric material, a locking element connected with the elastomeric material of said sealing element and consisting of a material which is substantially more rigid than the elastomeric material of said sealing element, said locking element being of annular basic shape and being divided at at least one point of its periphery for forming at this point two portions positioned at a distance from each other, and further comprising a connecting element positioned between said spaced portions of said locking element and consisting of a material which is substantially more elastic than the material of the locking element.

In a sealing ring of this kind the connection element consisting of elastomeric material will compensate for the deviations from a correct dimensional relationship between the locking element and the surfaces, for example surfaces forming a groove, engaged by the sealing ring, this compensation being provided by the fact that the size of the connecting element is elastically adapted so that the distance between the spaced portions of the locking element will vary so as to provide a correct dimension of the locking element in relation to said surfaces engaged by the sealing ring.

In a preferred embodiment of the sealing ring according to the invention the sealing element consisting of elastomeric material forms a recess in which the locking element is positioned and said connecting element positioned between two spaced portions of the locking element are constituted by a pad at least partially closing a portion of said recess. Said pad is preferably unitary with the elastomeric material of the sealing element.

The fact that the locking element according to the invention is not constituted by a continuous ring does not only obviate the tolerance problem but also provide a cheaper manufacturing operation as it is thereby possible to extrude the locking elements instead of moulding the elements.

Within the scope of the invention it is possible to include the elastomeric material connecting element with the locking element instead of manufacturing the connecting element as a separate portion or as a portion of the elastomeric material of the sealing element. Thereby, the locking element and the connecting element form a continuous ring of substantially uniform cross-sectional shape.

Of course, it is possible to provide the locking element with more than one elastomeric material connecting element, for example two or three connecting elements.

The invention is described in the following with reference to the accompanying drawings.

DETAILED DESCRIPTION OF THE INVENTION

Figure 1:
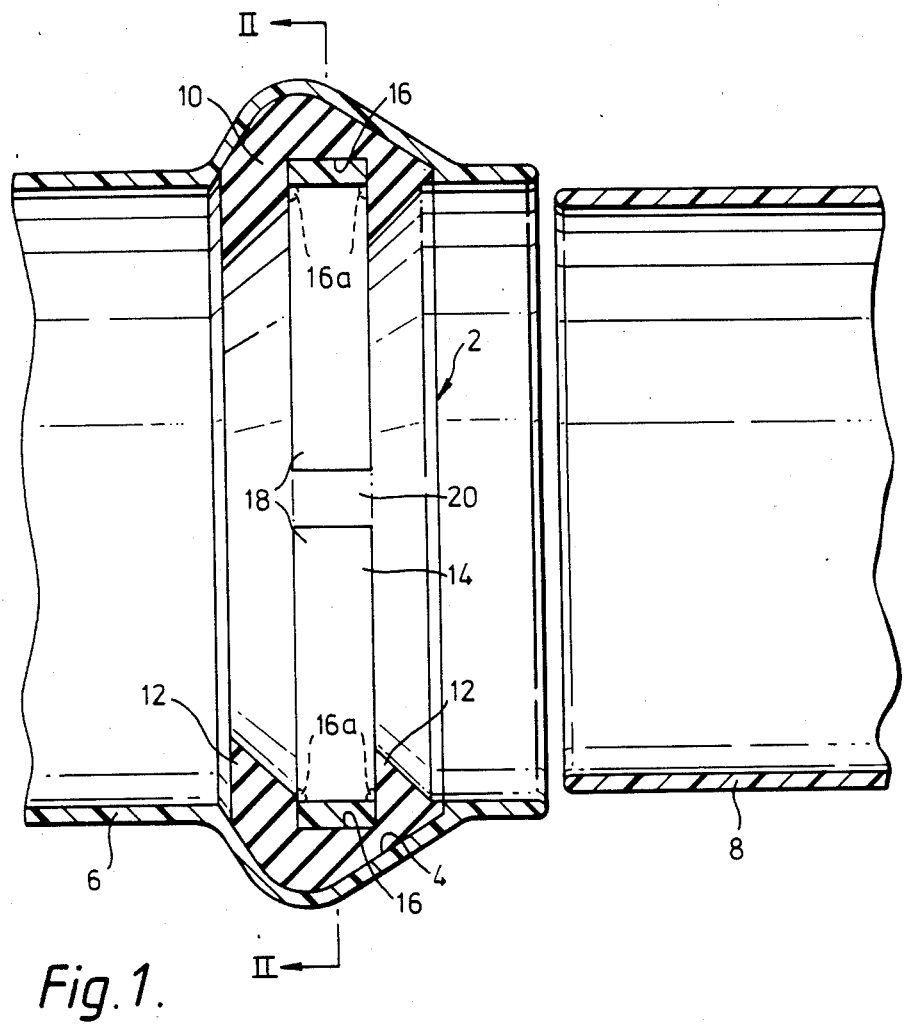
FIG. 1 is an axial section of a pipe socket provided with a sealing ring according to the invention.
Figure 2:
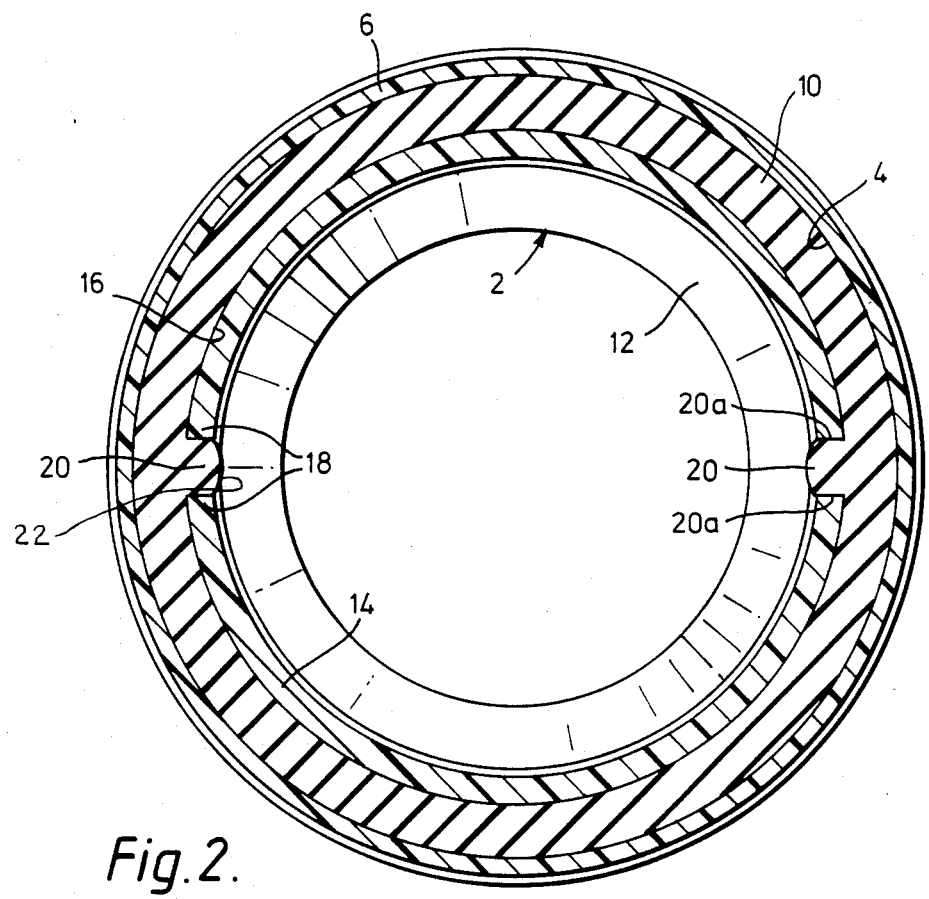
FIG. 2 is a section on line II—II in FIG. 1.

In FIGS. 1 and 2 there is shown a sealing ring 2 according to the invention, which ring is positioned in a groove 4 in a plastic pipe socket 6. The sealing ring 2 is adapted to seal the space between the inner surface of the socket 6 and the outer surface of a spigot end 8 of a plastic pipe, said spigot end being intended to be introduced into the socket end 6 for constituting a pipe joint.

The main portion of the sealing ring 2 is constituted by a sealing element 10 consisting of elastomeric material, preferably rubber. The sealing element 10 has radially inwards directed, continuous projections 12 providing a radial compression of the sealing element 10 between the bottom of the groove 4 and the outer surface of the spigot end 8 when the spigot end 8 is introduced in the socket end 6. This compression provides the pressing of the sealing element against the bottom of the groove and the outer surface of the spigot end, which is required for obtaining a tight joint.

In order to provide the sealing function described above it is necessary that the sealing element 10 consists of a relatively soft elastomeric rubber material. This fact in combination with the fact that the groove 4 is relatively shallow and has a rounded bottom surface provides that the sealing element 10 has itself insufficient rigidity to be securely retained in the groove 4. This is true especially during the jointing operation, i.e. when the spigot end 8 is introduced in the socket end 6 but also prior to the mounting of the pipe joint if a preapplication of the sealing ring 2 in the pipe socket is desired and after the mounting of the pipe joint when the different size of the sealing ring can be subjected to different pressures so that the sealing ring is forced from the groove 4 into the space between the socket end 6 and the spigot end 8 at one or the other side of the groove.

In order to retain the sealing ring 2 in the groove 4 of the socket 6 there is used a locking element 14 divided in two substantially semi-circular portions. The portions of the locking element 14 are positioned in a recess 16 formed in the elastomeric rubber material of the sealing element 10. The two portions of the locking element 14 have their end portions 18 positioned at a distance from each other. Connecting elements 20 are provided between the end portions 18. In the embodiment according to FIGS. 1-3 the connecting elements 20 are constituted by pads unitary with the elastomeric rubber material of the sealing element 10. Thus, the pads 20 constitute elements closing the recess 16 at the points thereof where the locking element 14 is divided.

The locking element 14 consists of a material which is substantially more rigid than the elastomeric rubber material of the sealing element 10, for example a semi-rigid or rigid plastic material. The portions of the locking element 14 can be manufactured either by moulding technique or by extrusion of a straight element which is divided to portions of suitable lengths which are thereupon positioned in the recess 16 while being bent to the circular shape thereof. The last mentioned manufacturing technique is substantially cheaper than the moulding technique. Thereby the length tolerances of the locking element 14 are adopted by the fact that the end portions 18 of the portions of the locking element 14 are more or less powerfully pressed against the pads 20 which are thereby subjected to a suitable deformation for making it possible to receiving the locking element 14 in the recess 16. Thereby, the pads 20 provide larger or smaller inwardly projecting bulges 22 thereby forcing the portions of the locking element 14 against the bottom of the groove 16 due to their tendency to revert to their original shape.

It is suitable to provide the surfaces 20a of the pads 20 engaged by the end portions 18 of the locking element 14 with an inclined shape in such a way that the angle between said surfaces 20a and the bottom of the recess 16 is less than 90°. Thereby, the end portions 18 are preventing from snapping out from the recess 16.

In order further to secure the retaining of the locking element 14 in the recess 16 the recess 16 can be formed with an undercut shape for example by providing beads 16a as shown by means of broken lines at the opening of the groove 16 at least in the regions of the end portions 18 of the locking element 14.

Figure 3:
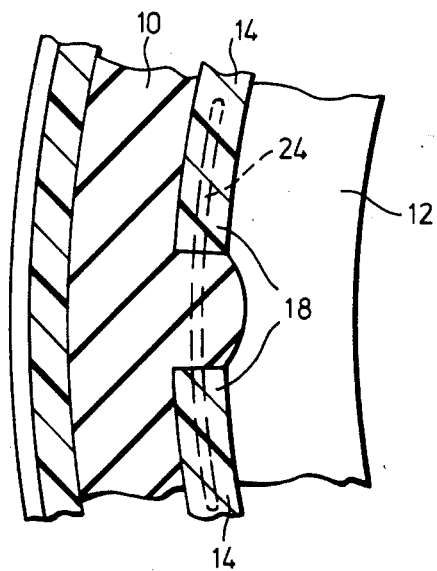
FIG. 3 is a fragmentary view of a detail of a modified embodiment of the sealing ring according to FIGS. 1 and 2 on an enlarged scale.

In order to make sure that the end portions 18 of the locking element 14 are retained in a position opposite to each other and in engagement with the pads 20 it is also possible to provide the end portions 18 with a connecting thread 24 as shown in FIG. 3. The thread 24 extends between adjacent end portions 18 and is retained in a groove in the adjacent pad 20.

Optionally the locking element 14 can be mounted in the recess 16 of the sealing element 10 prior to or after the mounting of the sealing ring in the groove 4 of the pipe socket 6.

In FIGS. 1 and 2 there is shown a locking element 14 consisting of two portions but it is realized that the locking element can consist of one single ring divided at one point thereof or of three or more portions.

Figure 4:
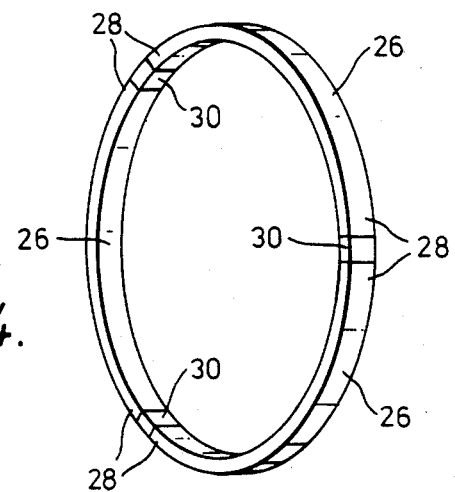
FIG. 4 is a perspective view of a locking element of an embodiment of a sealing ring according to the invention.

In FIG. 4 there is shown a perspective view of a locking element adapted to be included in a modified embodiment of a sealing ring according to the invention. The locking element according to FIG. 4 consists of three arch-shaped portions 26 having end portions 28 positioned at some distance from each other. The end portions 28 are connected with each other by means of intermediate connecting elements 30. The locking element 26 consists of a rigid or semi-rigid material, preferably a plastic material, while the connecting elements 30 consist of an elastomeric rubber material. The three portions of the locking element 26 and the connecting elements 30 positioned therebetween constitute a continuous ring having a uniform cross-sectional shape. The ring shown in FIG. 4 is adapted to be positioned in a continuous recess in a sealing element of the same kind as the sealing element 10 according to FIGS. 1 and 2. Thus, the embodiment according to FIG. 4 differs from the embodiment according to FIGS. 1 and 2 in the respect that the connecting elements 30 and 20, respectively, are in accordance with FIG. 4 firmly connected with the portions of the locking element 26 instead of being formed in one unit with the material of the sealing element 10. The locking element according to FIG. 4 has the same advantages with regard to the capacity of adopting tolerances, reliable retaining, simple mounting and so on as the embodiment of the locking element according to FIGS. 1 and 2. Also in the embodiment according to FIG. 4 the locking element can consist of the desired number of portions. For example in an embodiment of the locking element consisting of three arch-shaped portions it is possible to arrange all three points of separation and the connecting elements connected therewith at one and the same half of the ring constituted by locking elements and connecting elements, which makes it possible to position the ring in its recess in the sealing element by deforming the ring to heart-shape and expand the ring in the recess by reestablishing the circular shape of the ring.

Also in other respects the invention can be modified within the scope of the following claims.

I claim:

1. A sealing ring for sealing a space between two substantially concentric sealing surfaces in a pipe joint, comprising:
   an annular sealing element consisting of elastomeric material;
   a locking element connected with the elastomeric material of said sealing element for preventing displacement of said sealing ring in said space, said locking element being made of a material more rigid than said elastomeric material, said locking element having a substantially annular basic shape and being divided at at least one point of its periphery for forming two spaced portions; and a connecting element positioned between said portions of said locking element, said connecting element being made from a material more elastic than the material of said locking element.

2. A sealing ring as claimed in claim 1, in which the sealing element consisting of an elastomeric material forms a recess in which the locking element is positioned.

3. A sealing ring as claimed in claim 2, in which the connecting element positioned between the two portions of the locking element constitutes a pad at least closing a portion of said recess.

4. A sealing ring as claimed in claim 3, in which said pad is formed in one unit with the elastomeric material of said sealing element.

5. A sealing ring as claimed in claim 2, in which the recess is constituted by an open groove and in which the locking element includes at least one portion pressed into the groove.

6. A sealing ring as claimed in claim 5, in which the at least one portion of the locking element pressed into said groove is substantially straight prior to being pressed into said groove and being adapted to the shape thereof.

7. A sealing ring as claimed in claim 3, in which the surfaces of said pad opposing said spaced portions of the locking element form an angle with the bottom of the recess which is less than 90°.

8. A sealing ring as claimed in claim 2, in which the recess is of undercut shape at least in the regions of the spaced portions of the locking element.

9. A sealing ring as claimed in claim 1, in which said connecting element positioned between said spaced portions of the locking element are firmly connected with said portions of the locking element.

10. A sealing ring as claimed in claim 9, in which said locking element and said connecting element constitute a unitary ring having substantially uniform cross-sectional shape.

* * * * *